Oct. 19, 1971  R. F. NEWTON ET AL  3,613,224

MACHINE TOOL

Filed March 26, 1969  7 Sheets-Sheet 1

FIG. 1

INVENTORS
ROBERT F. NEWTON
TIBOR J. CSAPO

BY *Norman S. Blodgett*
ATTORNEY

United States Patent Office 3,613,224
Patented Oct. 19, 1971

3,613,224
MACHINE TOOL
Robert F. Newton and Tibor J. Csapo, Worcester, Mass., assignors to The Heald Machine Company, Worcester, Mass.
Filed Mar. 26, 1969, Ser. No. 810,626
Int. Cl. B23q 3/157
U.S. Cl. 29—568
5 Claims

ABSTRACT OF THE DISCLOSURE

This invention relates to a machine tool having an automatic tool-changing capability and, more specifically, to such an apparatus wherein the tools are stored in a rotatable magazine and transported to a driven spindle by an arm.

BACKGROUND OF THE INVENTION

In the machining industry, it has become common practice to make use of a machining center which is capable of performing a wide variety of stock-removal operations on a workpiece. A plurality of tools are stored adjacent the machining center and are presented sequentially to the spindle. The sequence of tool change and the movements required for the machining operations with the various tools are determined and automatically carried out by a numerical control making use of a program which has been set up on tape. The tool storage and change portions of these machines have, in the past, been complicated and expensive. Furthermore, they have not been readily adaptable to use as an optional accessory to a machine tool that is not originally designed for tool-changing operation. These and other difficulties experienced with the prior art devices have been obviated in a novel manner by the present invention.

It is, therefore, an outstanding object of the invention to provide a machine tool capable of tool storage and changing functions that is simple in construction and inexpensive to manufacture.

Another object of this invention is the provision of a machine tool having a combination tool-storage and tool-changer apparatus that requires little maintenance and is capable of a long life of useful service.

A further object of the present invention is the provision of a tool-storage and tool-changer assembly that can be readily applied to machining centers not specially designed for it.

It is another object of the instant invention to provide a tool changer and storage magazine that can be mounted on the side of the column of a machining center.

With these and other objects in view, as will be apparent to those skilled in the art, the invention resides in the combination of parts set forth in the specification and covered by the claims appended hereto.

SUMMARY OF THE INVENTION

In general, the present invention relates to a machine tool having a drive spindle, having a tool storage magazine mounted to rotate about a main axis spaced from and parallel to the axis of the spindle, and having a plurality of tools held in the magazine in a ring concentric with the axis and with their axes extending parallel to the axis. An arm is mounted in the magazine for movement radially of the main axis from a first position where its outer end is adjacent the ring of tools to a second position adjacent the spindle.

More specifically, the arm is provided at its outer end with a head having two opposed sets of tool-clamping fingers and the head is rotatable about an axis parallel to the main axis and between the sets. The arm is mounted in the direction of the main axis to remove and replace tools in the spindle and is also mounted for swinging movement about the main axis in a plane perpendicular to the main axis.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
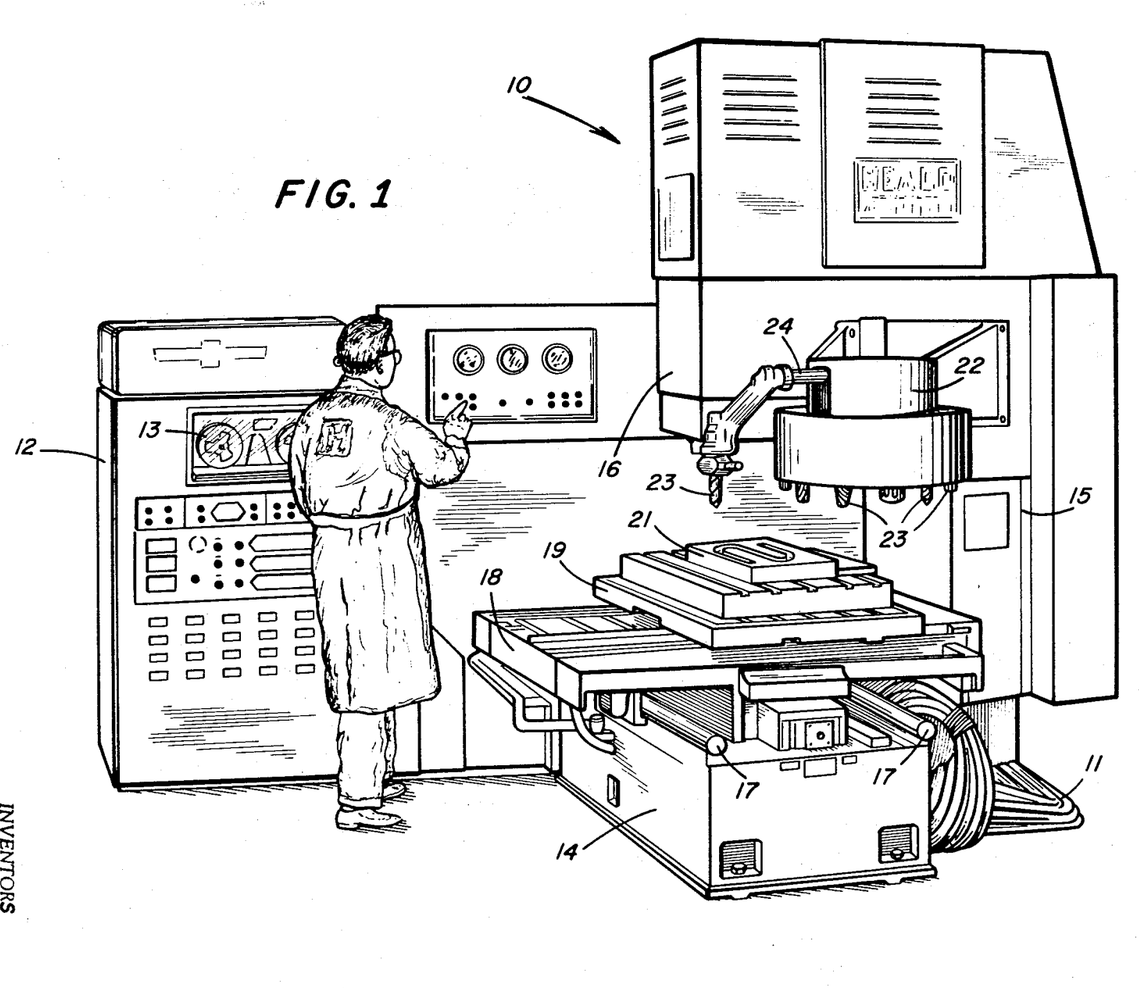
FIG. 1 is a perspective view of a machine tool embodying the principles of the present invention.

Referring first to FIG. 1, wherein are best shown the general features of the invention, the machine tool, indicated generally by the reference numeral 10, is shown as connected by cables 11 to a numerical control apparatus 12 having a tape reader 13. The machine tool is provided with a base 14 from which extends a vertical column 15 at the top of which is mounted for vertical movement along the Z-axis a spindle head 16. The upper surface of the base is provided with horizontal ways 17 on which is mounted for movement along the X-axis a table 18. The upper surface of this table is provided with horizontal ways (not shown) on which is mounted for movement along the Y-axis a table 19 on which is fastened a workpiece 21. Mounted on the column 15 is a tool storage and changer apparatus 22 in which a plurality of tools 23 are located. Extending from the apparatus is an arm 24 which is shown as carrying one of the tools 23.

Figure 2:
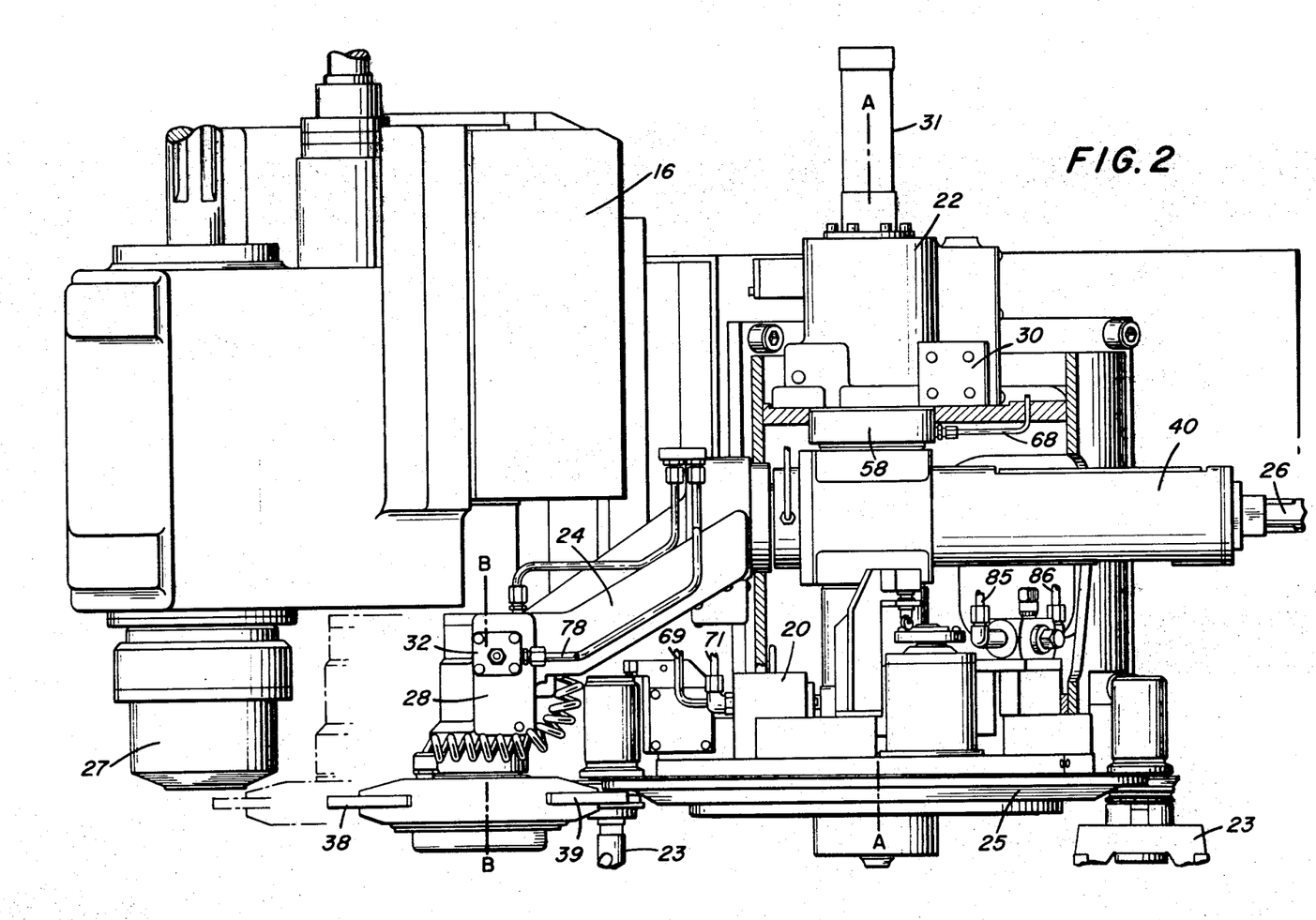
FIG. 2 is a side elevational view of a portion of the machine tool.

In FIG. 2 it can be seen that the apparatus 22 includes a tool storage magazine 25 which is mounted to be rotated by a motor 20 about a main axis A—A. The tools 23 are held in the magazine in a ring which is concentric with this axis and with their own axes parallel to it. The arm 24 is slidable in a cylinder 26 for movement axially in and out from a position at the tool storage ring, to an intermediate position, to a position at the spindle head.

The outer end of the arm 24 is provided with a head 28 having two opposed sets 38 and 39 of tool-clamping fingers this head is rotatable about a vertical axis B—B which is parallel to and spaced from the main axis A—A.

Figure 3:
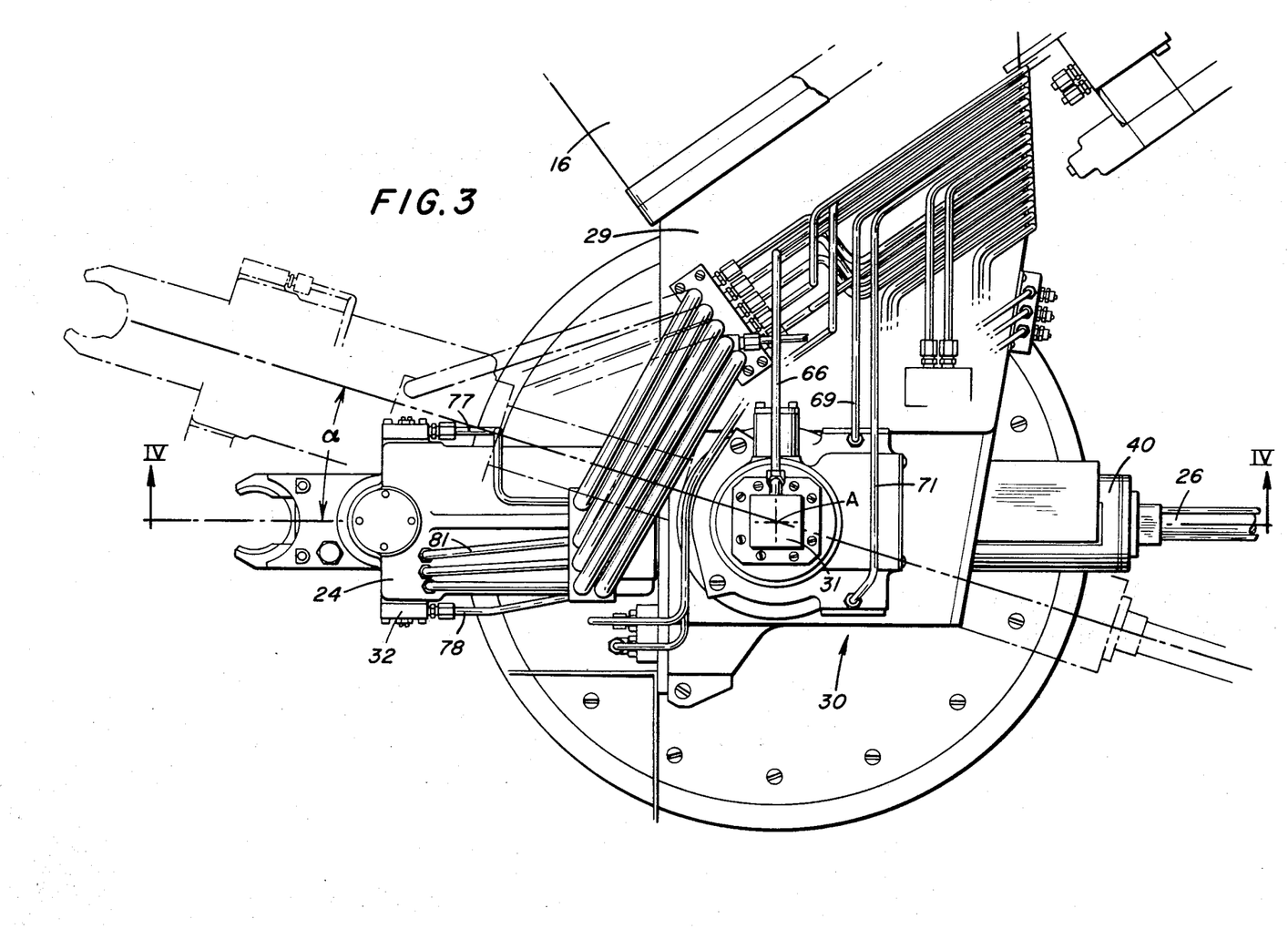
FIG. 3 is a plan view of the said portion.

As is evident in FIG. 3, the arm 24 is swingable through an angle about the main axis in a plane perpendicular thereto by means of a cylinder 30. The arm is also movable in the direction of the main axis to remove and replace tools in the spindle 27 under the impetus of a hydraulic cylinder 31 (see FIG. 2). The apparatus is supported by a bracket or housing 29 which is bolted to the column 15 (FIG. 1).

Figure 4:
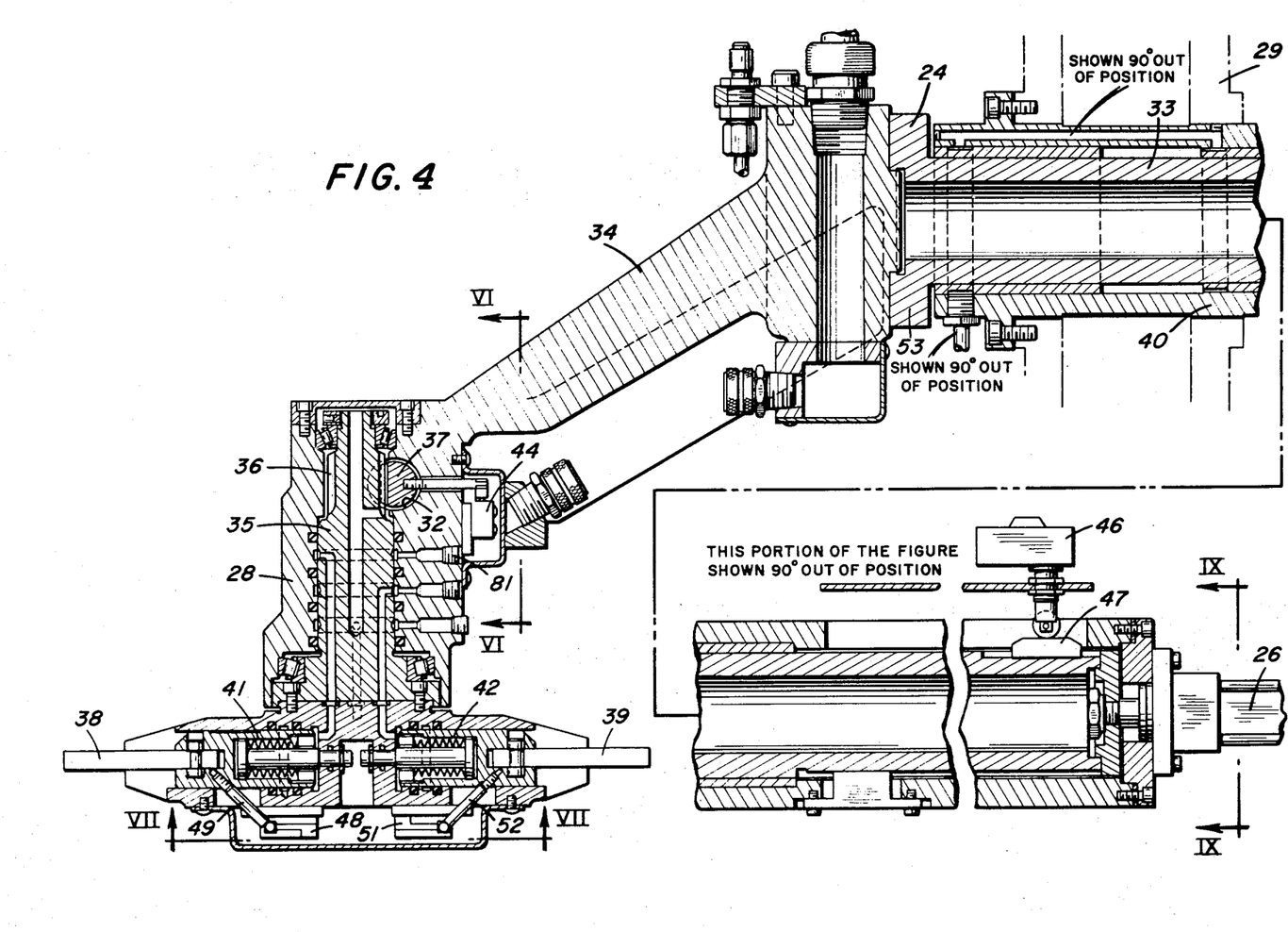
FIG. 4 is a vertical sectional view of an arm taken on the line IV—IV of FIG. 3.

In FIG. 4 it can be seen that the arm 24 has a tubular horizontal portion 33 which is slidable in a bushing housing 40 which, in turn, is mounted on the bracket 29. Between this horizontal portion and the head 28 is an inclined portion 34. Rotatable in the head is a vertical shaft 35 which is formed with a gear 36 which is engaged by a rack 37 driven by a cylinder 32. The set 38 of fingers is operated by a cylinder 41, while the set 39 is operated by a cylinder 42. A switch 48 is engaged by a finger 49 on the clamping mechanism of the set 38, while a similar switch 51 is engaged by a finger 52 on the set 39. A switch 46 is engaged by a cam 47 connected to the arm.

Figure 5:
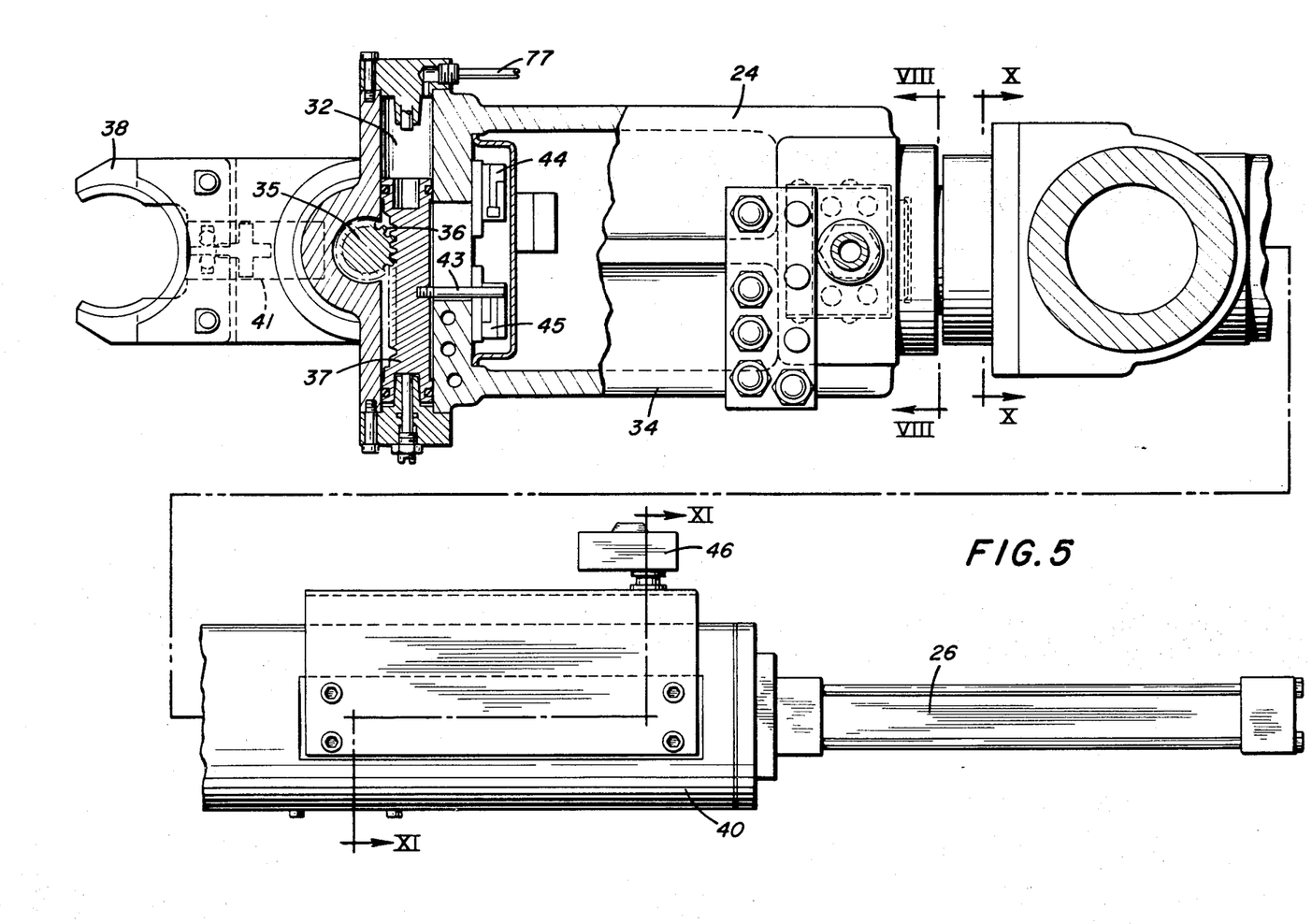
FIG. 5 is a plan view of the arm shown in FIG. 4.
Figure 6:
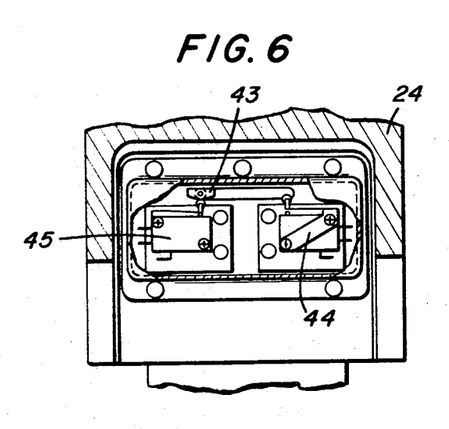
FIG. 6 is a vertical sectional view taken on the line VI–VI of FIG. 4.

FIG. 5 shows the details of the cylinder 32 and its rack 37. Adjustable end stops regulate the extremes of the head motion. A finger 43 movable with the piston rack engages switches 44 and 45 at the ends of its stroke. This arrangement is also shown in FIG. 6.

Figure 7:
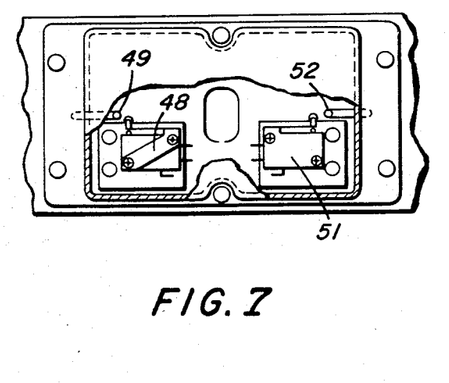
FIG. 7 is a horizontal sectional view taken on the line VII—VII of FIG. 4.
Figure 8:
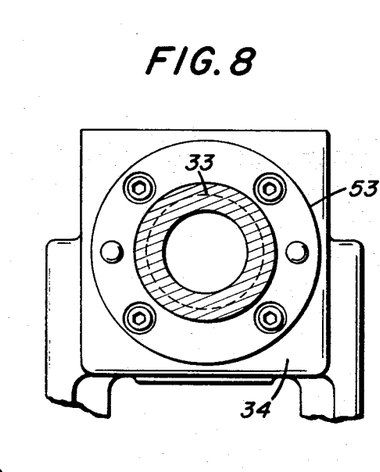
FIG. 8 is a vertical sectional view taken on the line VIII—VIII of FIG. 5.
Figure 9:
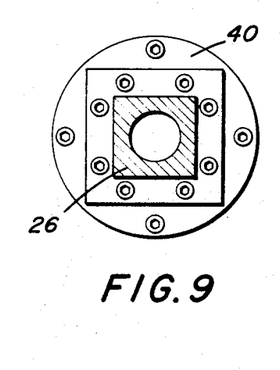
FIG. 9 is a vertical sectional view taken on the line IX—IX of FIG. 4.
Figure 10:
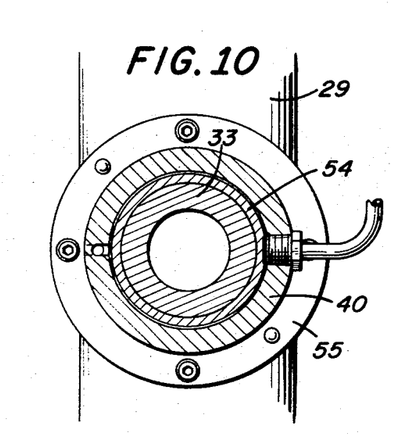
FIG. 10 is a vertical sectional view taken on the line X—X of FIG. 5.
Figure 11:
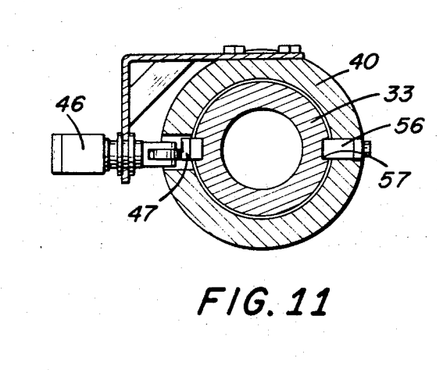
FIG. 11 is a sectional view taken on the line XI—XI of FIG. 5.

FIG. 7 shows the manner in which the switches 48 and 51 are related to the fingers 49 and 52 associated with the tool-clamping fingers. FIG. 8 shows how the horizontal portion 33 of the arm is provided with a flange 53 by which it is bolted to the upper end of the inclined portion 34. FIG. 9 illustrates the connection of the cylinder 26 to the outer end of the bushing housing 40. FIG. 10 shows the manner in which the horizontal portion 33 of the arm slides in a bushing 54 which, in turn, is mounted in the housing 40. The housing is provided with a flange 55 by which it is bolted to the main housing or bracket 29. FIG. 11 shows further details of the switch 46 and its relationship with the cam 47; this view shows a key 56 on the bushing housing 40 which engages a keyway 57 formed on the horizontal portion 33 of the arm to prevent undesired rotation of the arm about the axis of that portion.

Figure 12:
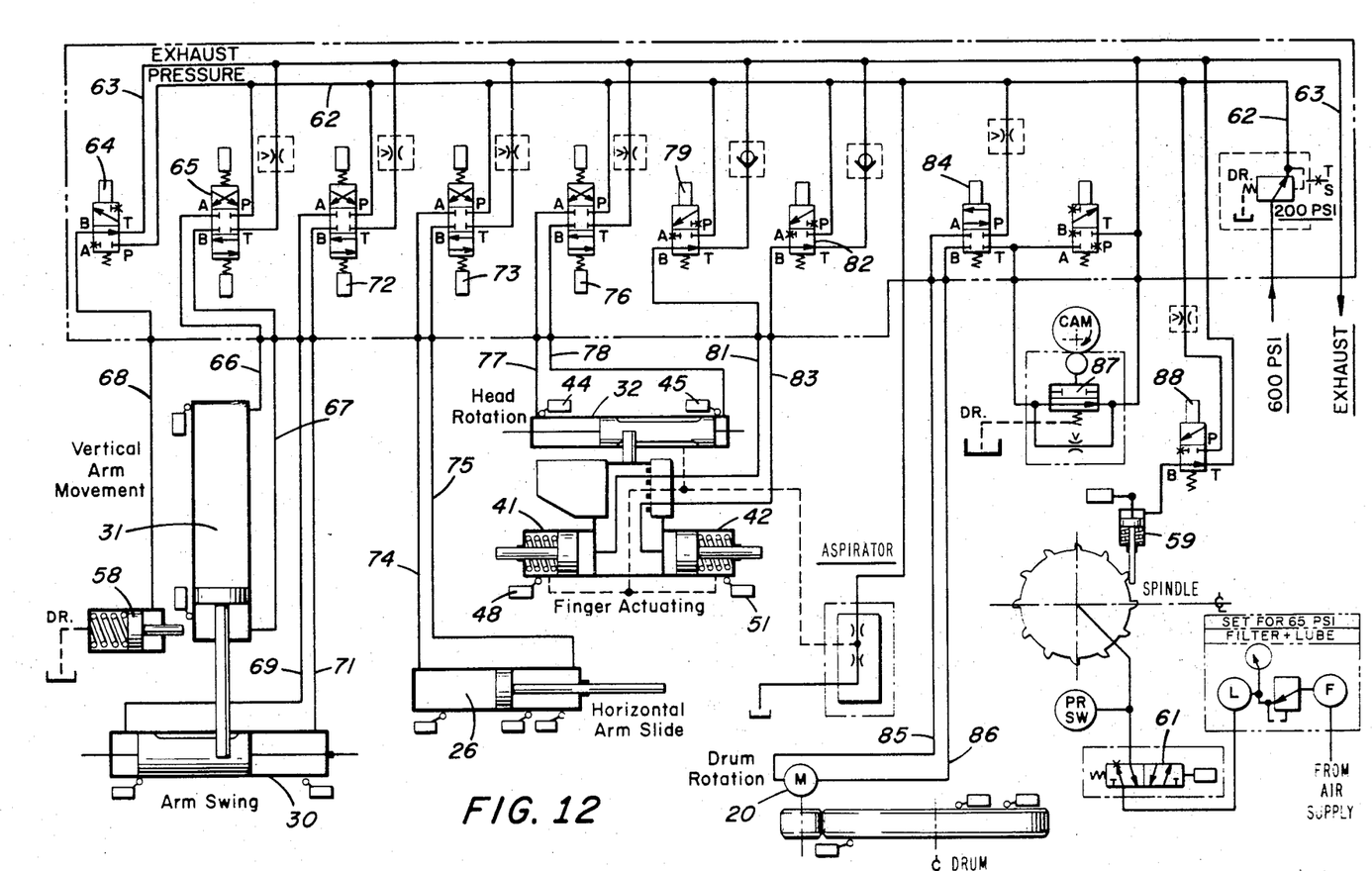
FIG. 12 is a schematic diagram of the mechanical and hydraulic elements in the machine tool.

FIG. 12 shows the interrelationship of the various hydraulic actuators with the circuitry which serves them. These actuators includes the vertical arm movement cylinder 31, the arm swing cylinder 30, a cylinder 58 for locking the arm against vertical movement in case of power loss, the horizontal arm slide cylinder 26, the finger-actuating cylinders 41 and 42, the head rotation cylinder 32, the tool storage drum rotation motor 20, and a spindle jogging cylinder 59. Pressure air to a spindle chuck is controlled by a solenoid valve 61. Pressure hydraulic fluid enters the system in a line 62, while it leaves through the exhaust line 63. A solenoid valve 64 controls the flow of fluid through a line 68 to the locking cylinder 58; a spring maintains the lock in operation and it is released only by the admission of pressure fluid, so that a "dead man" control exists. A solenoid valve 65 controls the flow of fluid to and from the opposite ends of the vertical arm movement cylinder 31 through lines 66 and 67 (see FIG. 3). The flow of fluid to the ends of the arm swing cylinder 30 through lines 69 and 71 (see FIG. 3) is controlled by a solenoid valve 72. A solenoid valve 73 operates through lines 74 and 75 to control the flow of fluid to the ends of the horizontal arm slide cylinder 26. The head rotation cylinder 32 is controlled by a solenoid valve 76 operating through lines 77 and 78. The fluid which actuates the finger-actuating cylinder 41 is controlled by a solenoid valve 79 operating through a line 81, while the cylinder 42 is similarly served by a solenoid valve 82 operating through a line 83. The flow of pressure fluid to the drum rotation motor 20 is regulated by a solenoid valve 84 operating through lines 85 and 86; valve 87 controls the speed of the motor from zero to maximum to locate the drum. A solenoid valve 88 operates the spindle jog cylinder 59.

The operation of the apparatus will now be clearly understood, in view of the above description. The tool storage and changer apparatus 22 is a sequential operating mechanism which carries a used tool from a collet chuck mounted on the vertical spindle 27 on the machine tool 10 to the tool storage magazine mounted on the side of the machine. In addition, it inserts a new tool into the chuck before returning to the storage area. The tool changer as a unit consists of the following mechanisms:

(1) Tool clamping fingers

The head 28 carries the two sets 38 and 39 of fingers which are used to transport the used and new tools throughout the cycle. The fingers have the ability to open and close in a fail-safe manner. They are hydraulically actuated by the cylinders 41 and 42 to open and release the tool after it is secured in the chuck or storage magazine. Releasing the hydraulic pressure returns the fingers to a spring-clamped condition on a tool. In addition, the fingers rotate 180° under the chuck to align the new tool with the chuck and orientate the old tool for storage. The rotation is accomplished by the cylinder 32.

(2) Horizontal arm

The head (with fingers) is carried on the arm 24 which has the ability to move in three directions. It has an X-axis movement (horizontal) to carry the tool from the storage device to a ready-station and to a position under the spindle head 16 to the spindle 27 itself. The X-axis travel is brought about by the hydraulic cylinder 26 mounted on the end of the arm. The arm has a Y-axis movement (vertical) to remove tools from and to insert them into the collet chuck. This vertical movement is accomplished by the hydraulic cylinder 31. The third movement is a horizontal rotation which moves the tools from a position under the spindle head to a ready station. This is necessary so that the machine can cycle without interference while it is waiting for another tool change. Rotation is brought about by a rack and pinion that is hydraulically actuated in both directions by the cylinder 30.

(3) Drum unit

This unit is the storage device used to carry 16 tools in the preferred embodiment. The storage device or magazine 25 is mounted in a horizontal plane and carries its tools 23 in a vertical plane. The tools are maintained in a seat and are held in place by a Teflon-coated ring which surrounds the tools. The storage device rotates in a sequential manner and is positioned by a deceleration valve and a micro-switch. As a new tool is removed from its seat, an old tool takes its place in the storage device. After a complete cycle, the tools will still be in the proper sequence but will be one tool seat out of position. For this reason, it is necessary to code the first tool of the sequence so an identical cycle can be performed without manually reloading the tools in the storage device.

By energizing a solenoid operated valve, it is possible to bypass the deceleration valve and every tool seat to go directly to the number one tool. This is necessary, if less than 16 tools are used in any program, because there would be lost time in stopping at every empty seat. There is a micro-switch on the tool changer which signals the approach of the first tool. This switch deenergizes the bypass valve and returns the deceleration valve to an operating condition. The storage magazine rotation is accomplished by the hydraulic motor 20 coupled to a speed reducer and an internal gear and pinion.

(4) Turret unit

This unit includes the main bracket 29 which mounts to the column of the machining center. The bracket also provides the support and connections for all the previously discussed units. In addition, this bracket houses all the hydraulic valves and electrical junction boxes. The turret has a safety lock operated by the cylinder 58 which prevents the horizontal arm 24 from creeping down when the hydraulic power to the machine is off. In this condition, a spring locks the safety, but under power, hydraulic oil compresses the spring and releases the safety for normal operation of the tool changer. It will be understood that each tool 23 includes a gear-driven adaptor with a V-groove for holding the adaptor by means of the fingers. Almost any configuration of shank for standard tooling can be used in the adaptor, such as a Morse taper, straight shank bore, or milling taper.

The spindle chuck is an air-operated collet chuck with gear teeth to drive the adaptors. Air is introduced to the chuck through a rotary coupling mounted on the spindle spline shaft. The chuck is fail-safe to prevent a tool from falling out in the event of a power failure. Tools are locked into the chuck by a spring-loaded collet and are unlocked by air pressure. Spindle and tool orientation is not required with the tool changer because of the gear teeth drivers. A jogging unit operated by the cylinder 59 is mounted inside the spindle transmission to automatically rotate the spindle in the event of line-to-line contact with the gear teeth on the adaptor and in the chuck.

The tool changer is normally in a "ready station position" with the empty fingers pointed outward from the storage device. The second set of fingers have a new tool 23 clamped 180° from the empty set of fingers. In a vertical direction, the ready station position is in a plane with the tool in the storage device and the tool in the spindle when the spindle is in its uppermost position. The complete cycle starts from this position when a tool change signal from the control 12 is commanded. A complete cycle, step-by-step is as follows:

(1) Arm 24 rotates from ready station position to align empty fingers with the tool 23 in the chuck on the spindle 27.

(2) The fingers open by introducing pressure fluid to cylinders 41 or 42.

(3) Arm is extended outwardly by cylinder 26 to pick up the tool in the chuck.

(4) The fingers clamp on the tool in the chuck.

(5) The chuck releases.

(6) The arm is moved downwardly by the cylinder 31, thus removing the tool from the chuck.

(7) The fingers are rotated 180° by the cylinder 32 to align the new tool with the chuck.

(8) The arm moves up to insert new tool in the chuck.

(9) The chuck clamps the new tool.

(10) The fingers open.

(11) The arm retracts to the ready station length.

(12) The arm is rotated by the cylinder 30 to the ready station position. The machine can start machining at this point.

(13) The arm retracts to rear position to insert the old tool in the storage device (previous tool seat).

(14) The fingers open.

(15) The arm extends to ready station length.

(16) The storage device is rotated by the motor 20, one index to align the new tool with the empty fingers.

(17) The arm retracts and the fingers locate on the new tool in the storage device.

(18) The fingers clamp on the new tool.

(19) The arm extends to the ready station position with the new tool in the fingers. At this point, the tool changer is ready to make a tool change once again.

The manner in which the numerical control apparatus 12 operates is as follows:

(1) At the start of a tape program, there will be no tool in the chuck or the interchange arm. The tool storage magazine will contain all the necessary tools 23 in proper sequence and the first tool must be in position to be removed from the magazine.

(2) When the "cycle start" push button on the machine tool is operated, the first block of tape will be read in the reader 13. This may include "X" and "Y" dimension, "G" function, and "M" function for tool change.

(3) After the first tool has been picked up, the tape will start the sequence of the automatic tool change to perform a complete tool interchange. Removing the old tool will be a dummy operation, since there is no old tool in the chuck at this time.

(4) At the completion of tool interchange, the arm returns to the ready station. The tape reader 13 now reads the next block of information and the machine starts to work; meanwhile the tool changer continues through a storage cycle. (The first storage cycle will be a dummy operation, since there is no "old" tool in the fingers at this time.) When the arm returns to the ready station position, after storing the tool, the drum rotates to #2 position and the arm removes #2 tool from the drum.

(5) Each time a tool change is programmed, the tool interchange will take place, the old tool will be stored, the drum will be indexed, and the next tool in sequence will be picked up. This will continue until all tools in the program have been used.

(6) When the final operation with the last tool has been completed, the same sequence as in #5 will be followed. Inserting a new tool into the chuck will be a dummy operation, since there is no new tool in the interchange arm at this time. The sequence will continue until the last tool is stored in the drum.

However, the last block of tape which contains an end of program function will have been read. This will rotate the drum to #1 position as detected by a limit switch operated by a cam attached to tool #1. The arm will be inhibited from picking up the next tool.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool having a vertical driven spindle, comprising
    (a) a tool storage magazine mounted to rotate about a vertical main axis substantially spaced from the driven spindle,
    (b) a plurality of tools held in the magazine in a ring concentric with the axis and with their axes extending parallel to the axis, and
    (c) an arm mounted in the magazine for swinging movement about the main axis in a plane perpendicular to the main axis and for longitudinal sliding movement radially of the main axis from a first position where its outer end is adjacent the ring of tools to a second position adjacent the spindle, the arm being movable in the direction of the main axis to remove and replace tools in the spindle.

2. A machine tool as recited in claim 1, wherein the outer end of the arm is provided with tool-clamping fingers.

3. A machine tool as recited in claim 1, wherein the arm is provided at its outer end with a head having two opposed sets of clamping fingers and wherein the head is rotatable about an axis parallel to the main axis passing and between the sets.

4. A machine tool as recited in claim 1, wherein the spindle axis is parallel to and spaced from the main axis.

5. A machine tool as recited in claim 3, wherein the head is rotatable 180° between two positions in either of which the set of clamping fingers lie on a line extending longitudinally of the arm, and wherein the arm swings through a substantial angle from a first position where it lies along a line joining the main axis to the spindle and it is radially slidably movable to move the clamping fingers into operative relationship with the spindle to a second position where it is radially slidably movable to present and remove tools from the tool storage magazine.

References Cited

UNITED STATES PATENTS

| | | | |
|---|---|---|---|
| 3,384,953 | 5/1968 | Schrolocke | 29—568 |
| 3,458,924 | 8/1969 | Oslebo et al. | 29—568 |

FRANCIS S. HUSAR, Primary Examiner

F. R. BILINSKY, Assistant Examiner